United States Patent
Boatwright et al.

(10) Patent No.: US 9,847,143 B2
(45) Date of Patent: Dec. 19, 2017

(54) NUCLEAR FUEL ELEMENT

(71) Applicant: Westinghouse Electric Company LLC, Cranberry Township, PA (US)

(72) Inventors: David A. Boatwright, Lexington, SC (US); Kenneth K. Klapper, Columbia, SC (US); Jacob X. Huang, Columbia, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 1130 days.

(21) Appl. No.: 14/264,283

(22) Filed: Apr. 29, 2014

(65) Prior Publication Data
US 2015/0310940 A1     Oct. 29, 2015

(51) Int. Cl.
*G21C 3/10* (2006.01)
*G21C 3/16* (2006.01)

(52) U.S. Cl.
CPC .............. *G21C 3/10* (2013.01); *G21C 3/16* (2013.01); *Y02E 30/40* (2013.01)

(58) Field of Classification Search
CPC ... G21C 3/00; G21C 3/04; G21C 3/06; G21C 3/10; G21C 3/105; G21C 3/16; G21C 3/17; G21C 3/18
See application file for complete search history.

(56) References Cited

U.S. PATENT DOCUMENTS

| | | |
|---|---|---|
| 4,106,985 A | 8/1978 | Molloy et al. |
| 4,783,311 A | 11/1988 | Ferrari |
| 4,921,663 A * | 5/1990 | Boatwright .............. G21C 3/10 376/261 |
| 7,570,728 B2 | 8/2009 | Hultquist et al. |
| 2012/0177170 A1 | 7/2012 | Aleshin et al. |
| 2014/0029713 A1 | 1/2014 | Evans et al. |

* cited by examiner

*Primary Examiner* — Marshall P O'Connor
(74) *Attorney, Agent, or Firm* — Joseph C. Spadacene; Westinghouse Electric Company LLC

(57) ABSTRACT

A top end plug design for a nuclear fuel rod or control rod that maximizes the fuel rod length and internal volume for high burn-up, but limits plenum spring melting for eutectic formation margin. The press fit length of the top end plug is increased to increase the distance from the center of heat from the TIG welding process that seals the end plug to the cladding, to the back face of the end plug. A hole in the back of the end plug is enlarged to recover the volume loss from the press fit length increase.

8 Claims, 4 Drawing Sheets

NUCLEAR FUEL ELEMENT

BACKGROUND

1. Field

This invention pertains generally to a nuclear reactor internals structure and more particularly to components such as fuel rods that employ an active ingredient within a hermetically sealed cladding, with the active ingredient held in position by a plenum spring.

2. Related Art

The primary side of nuclear reactor power generating systems which are cooled with water under pressure comprises a closed circuit which is isolated and in heat exchange relationship with a secondary side for the production of useful energy. The primary side comprises the reactor vessel enclosing a core internal structure that supports a plurality of fuel assemblies containing fissile material, the primary circuit within heat exchange steam generators, the inner volume of a pressurizer, pumps and pipes for circulating pressurized water, the pipes connecting each of the steam generators and pumps to the reactor vessel independently. Each of the parts of the primary side comprising a steam generator, a pump, and a system of pipes which are connected to the vessel form a loop of the primary side.

For the purpose of illustration, FIG. 1 shows a simplified nuclear reactor primary system, including a generally cylindrical reactor pressure vessel 10 having a closure head 12 enclosing a nuclear core 14. A liquid reactor coolant, such as water, is pumped into the vessel 10 by pump 16 through the core 14 where heat energy is absorbed and is discharged to a heat exchanger 18, typically referred to as a steam generator, in which heat is transferred to a utilization circuit (not shown) such as a steam driven turbine generator. The reactor coolant is then returned to the pump 16, completing the primary loop. Typically, a plurality of the above-described loops are connected to a single reactor vessel 10 by reactor coolant piping 20.

An exemplary reactor design is shown in more detail in FIG. 2. In addition to the core 14 comprised of a plurality of parallel, vertical, co-extending fuel assemblies 22, for purposes of this description, the other vessel internal structures can be divided into the lower internals 24 and the upper internals 26. In conventional designs, the lower internals' function is to support, align and guide core components and instrumentation as well as direct flow within the vessel. The upper internals restrain or provide a secondary restraint for the fuel assemblies 22 (only two of which are shown for simplicity in this Figure), and support and guide instrumentation and components, such as control rods 28. In the exemplary reactor shown in FIG. 2, coolant enters the reactor vessel 10 through one or more inlet nozzles 30, flows down through an annulus between the vessel and the core barrel 32, is turned 180 degrees in a lower plenum 34, passes upwardly through a lower support plate 37 and a lower core plate 36 upon which the fuel assemblies 22 are seated and through and about the assemblies. In some designs, the lower support plate 37 and the lower core plate 36 are replaced by a single structure, the lower core support plate, at the same elevation as 37. The coolant flow through the core and surrounding area 38 is typically large in the order of 400,000 gallons per minute for a four loop plant (generally, the flow rate is approximately 100,000 gallons per minute per loop), at a velocity of approximately 20 feet per second. The resulting pressure drop and frictional forces tend to cause the fuel assemblies to rise which movement is restrained by the upper internals, including a circular upper core plate 40. Coolant exiting the core 14 flows along the underside of the upper core plate 40 and upwardly through a plurality of perforations 42. The coolant then flows upwardly and radially to one or more outlet nozzles 44.

The upper internals 26 can be supported from the vessel or the vessel head and include an upper support assembly 46. Loads are transmitted between the upper support assembly 46 and the upper core plate 40 primarily by a plurality of support columns 48. A support column is aligned above a selected fuel assembly 22 and perforations 42 in the upper core plate 40.

Rectilinearly movable control rods 28 typically include a drive shaft 50 and a spider assembly 52 of neutron poison rods that are guided through the upper internals 26 and into aligned fuel assemblies 22 by control rod guide tubes 54. The guide tubes are fixedly joined at one end to the upper support assembly 46 and connected at the other end to the top of the upper core plate 40 by a split pin force fit into the top of the upper core plate 40. The pin configuration provides for ease of guide tube assembly and replacement if ever necessary and assures that the core loads, particularly under seismic or other high loading accident conditions are taken primarily by the support columns 48 and not the guide tubes 54. This support column arrangement assists in retarding guide tube deformation under accident conditions which could detrimentally affect control rod insertion capability.

FIG. 3 is an elevational view, represented in vertically shortened form, of a fuel assembly being generally designated by reference character 22. The fuel assembly 22 is the type used in a pressurized water reactor and has a structural skeleton which, at its lower end, includes a bottom nozzle 58. The bottom nozzle 58 supports the fuel assembly 22 on a lower core support plate 36 in the core region of the nuclear reactor. In addition to the bottom nozzle 58, the structural skeleton of the fuel assembly 22 also includes a top nozzle 62 at its upper end and a number of guide thimbles 54 which extend longitudinally between the bottom and top nozzles 58 and 62 and at opposite ends are rigidly attached thereto.

The fuel assembly 22 further includes a plurality of transverse grids 64 axially spaced along and mounted to the guide thimbles 54 (also referred to as guide tubes) and an organized array of elongated fuel rods 66 transversely spaced and supported by the grids 64. Although it cannot be seen in FIG. 3, the grids 64 are conventionally formed from orthogonal straps that are interleaved in an egg-crate pattern with the adjacent interface of four straps defining approximately square support cells through which the fuel rods 66 are supported in transversely spaced relationship with each other. In many conventional designs, springs and dimples are stamped into opposing walls of the straps that form the support cells. The springs and dimples extend radially into the support cells and capture the fuel rods therebetween; exerting pressure on the fuel rod cladding to hold the rods in position. Also, the assembly 22 has an instrumentation tube 66 located in the center thereof that extends between and is mounted to the bottom and top nozzle 58 and 62. With such an arrangement of parts, fuel assembly 22 forms an integral unit capable of being conveniently handled without damaging the assembly of parts.

As mentioned above, the fuel rods 66 in the array thereof in the assembly 22 are held in spaced relationship with one another by the grids 64 spaced along the fuel assembly length. Each fuel rod 66 includes a plurality of nuclear fuel pellets 70 and is closed at its opposite ends by upper and lower end plugs 72 and 74. The pellets 70 are maintained in a stack by a plenum spring 76 disposed between the upper end plug 72 and the top of the pellet stack. The fuel pellets 70, composed of fissile material, are responsible for creating the reactive power of the reactor. The cladding which surrounds the pellets functions as the barrier to prevent the fission by-products from entering the coolant and further contaminating the reactor system. The plenum 60 in which the plenum spring resides is a space allocated to collect these fission by-products.

To control the fission process, a number of control rods 78 are reciprocally movable in the guide thimbles 54 located at predetermined positions in the fuel assembly 22. Specifically, a rod cluster control mechanism 80, positioned above the top nozzle 62, supports the control rods 78. The control mechanism has an internally threaded cylindrical hub member 82 with a plurality of radially extending flukes or arms 52. Each arm 52 is interconnected to the control rods 78 such that the control rod mechanism 80 is operable to move the control rods vertically in the guide thimbles 54 to thereby control the fission process in the fuel assembly 22, under the motive power of control rod drive shafts 50 which are coupled to the control rod hubs 80, all in a well-known manner.

As previously mentioned, the fuel assemblies are subject to hydraulic forces that exceed the weight of the fuel rods and thereby exerts significant forces on the fuel rods and the fuel assemblies. In addition, there is significant turbulence in the coolant in the core caused by mixing vanes on the upper surfaces of the straps of many grids, which promote the transfer of heat from the fuel rod cladding to the coolant. The substantial flow forces and turbulence can result in severe vibration of the fuel rod cladding if motion of the fuel rods is not restrained. This vibratory motion can result in small pellet chips which is undesirable. The plenum spring 76 functions to secure the fuel pellet 70 against the lower end plug 74 minimizing the likelihood of such damage.

The end plugs 72 and 74 are welded to the cladding. It has been found, however, that welding of the top end plug 72 has resulted in some cases in the melting of an upper portion of the spring 76, thereby, to some extent, compromising the force that it was designed to exert on the fuel pellets; and a portion of the spring that melts may contact and compromise the strength of the cladding. Accordingly, it is an object of this invention to provide a new upper end plug design that provides maximum fuel rod length and internal volume for high burn-up, but limits plenum spring melting for eutectic formation margin.

SUMMARY

These and other objects are achieved by a fuel assembly element having a tubular cladding with a lower end cap closing off a lower end of the tubular cladding and an upper end cap closing off an upper end of the tubular cladding. The lower end portion of the upper end cap has a diameter that fits within the upper end of the tubular cladding and extends down into an interior of the tubular cladding a preselected distance. An upper end portion of the upper end cap is welded to the upper end of the tubular cladding to seal off the upper cladding end. A measure of an active material occupies a portion of the interior of the tubular cladding between the lower end cap and the upper end cap. A spring is positioned in the interior of the tubular cladding between the upper end cap and upper surface of the measure of active material, with one end of the spring against the lower end of the upper end cap and the other end of the spring biasing the active material towards the lower end cap. The preselected distance is selected so that heat from the welding process that is employed to weld the upper end portion of the upper end cap to the upper end of the tubular cladding is dissipated at an interface of the one end of the spring and the lower end portion of the upper end cap, to an extent that avoids substantial melting at the interface of the upper end cap and the spring. In one embodiment, the nuclear fuel assembly element is a fuel rod and in a second embodiment, the nuclear fuel assembly element is a control rod.

In accordance with this invention, the spring extends through a gas plenum in the interior of the tubular cladding and the lower end portion of the upper end cap has a recess in fluid communication with the gas plenum that adds to a storage volume of the gas plenum. The size of the recess is gauged to substantially compensate for an added volume of the interior of the cladding occupied by the lower end portion of the upper end cap over that that would be occupied by a conventional upper end cap so that the measure of the active element that the interior of the tubular cladding can safely accommodate is not substantially reduced over that employed in a conventional fuel element. Preferably, the recess has a volume defined by a depth of approximately 0.2-0.24 inch (0.51-0.61 cms.) and a diameter of approximately 0.125-0.156 inch (0.32-0.40 cms.). Furthermore, in the foregoing embodiment, the lower end portion of the upper end cap has a sidewall that preferably extends from a press fit length at an eight degree-nine degree angle and in one embodiment the press fit length is approximately 0.080-0.150 inch (0.203-0.381 cms.). Desirably, the total extent of the upper end plug within the tubular cladding is approximately 0.175 inch (0.445 cms.).

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
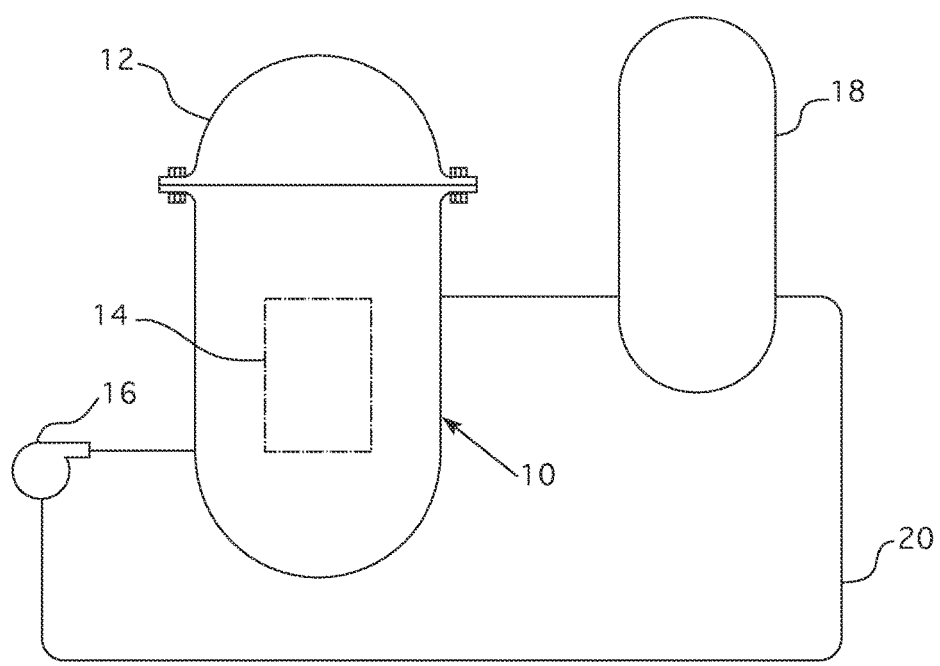
FIG. 1 is a simplified schematic of a nuclear reactor system to which this invention can be applied.
Figure 2:
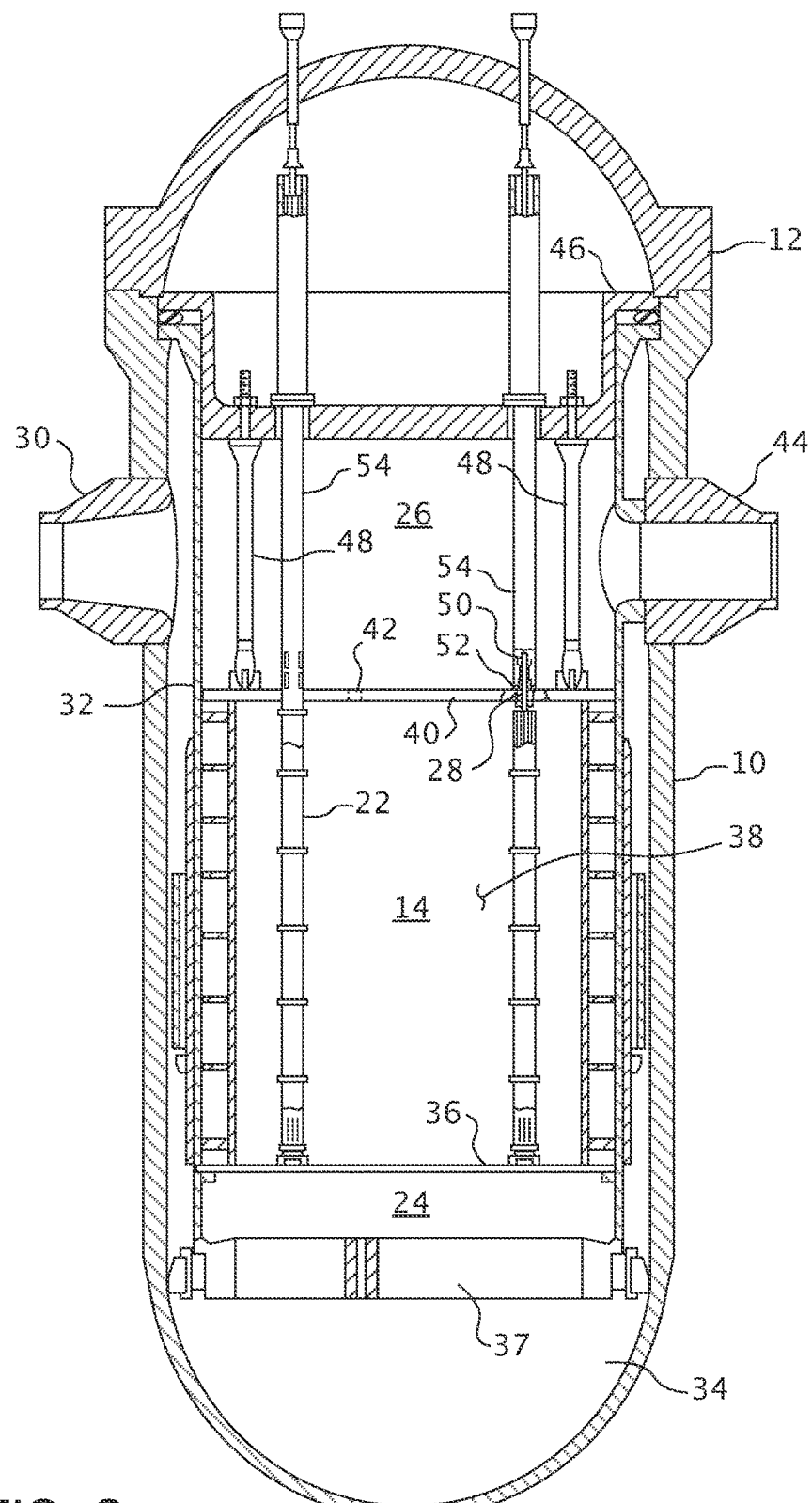
FIG. 2 is an elevational view, partially in section, of a nuclear reactor vessel and internal components to which this invention can be applied.
Figure 3:
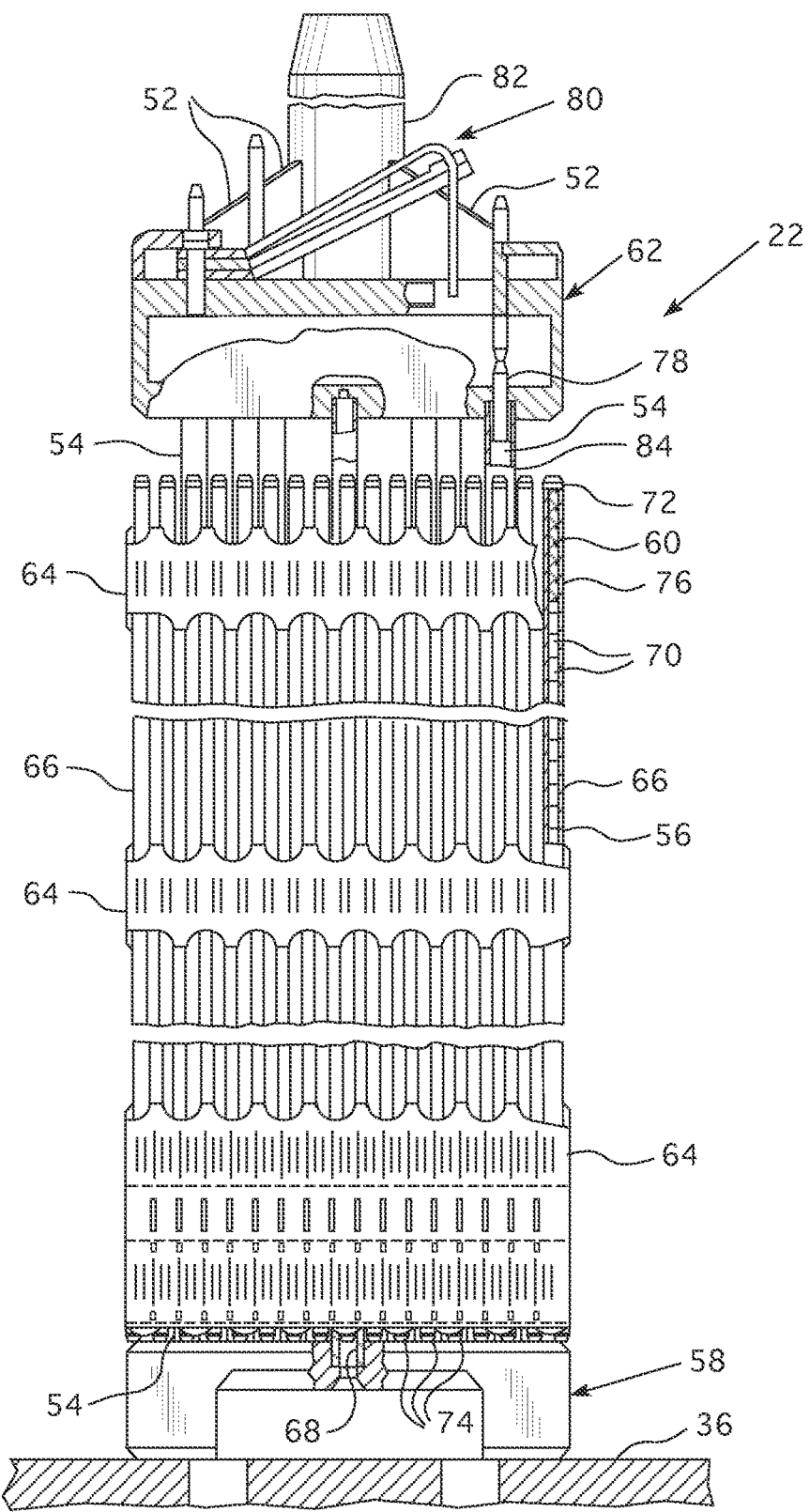
FIG. 3 is an elevational view, partially in section, of a fuel assembly illustrated in vertically shortened form, with parts broken away for clarity.
Figure 4:
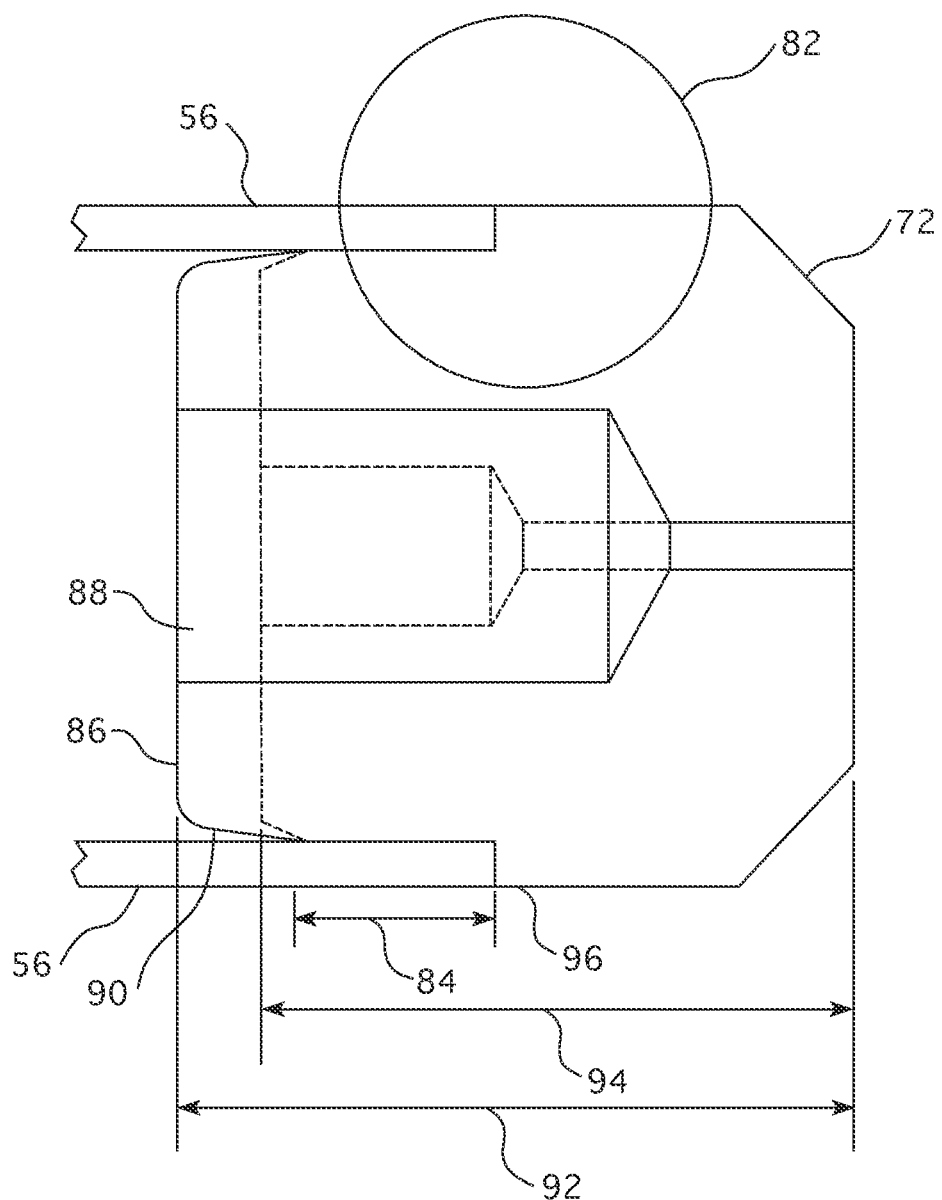
FIG. 4 is a schematic of the upper end of a fuel rod with an upper end plug in place, illustrating one embodiment of this invention, with the differences between this embodiment and a conventional embodiment shown in dotted form.

A new top end plug design in accordance with one embodiment of this invention has specific dimensions and features that give maximum fuel rod length and internal volume for high burn-up, but limits plenum spring melting for eutectic formation margin, is illustrated in FIG. 4. Deviations from a conventional top end plug are shown in dotted form. The upper end plug 72 is TIG welded to the fuel rod cladding 56 at the fuel rod to top end plug interface on the upper end of the cladding which, results in some plenum spring melting due to the high temperature inherent in the process. The region of melting of the cladding and upper end plug materials is shown by the circle designated 82 though, because of the differences in those materials and the high temperature of the welding process the portion of the spring (not shown in this Figure) that abuts the lower surface 84 of the upper end plug 72 has also experienced some melting. The conventional end plugs, which are shown in dotted form in FIG. 4, have little margin against eutectic formation. The inventors have found that a slight increase in the end plug length 84, in the order of 0.045 inch to 0.060 inch (1.14-0.15 cms.) will increase the eutectic margin and avoid melting of the spring. This slight increase to the press fit length increases the distance from the center of heat to the back face 86. The hole or recess 88 in the center of the back end of the upper end plug is increased in diameter and depth to recover the volume loss from the length increase in the press fit. The enlarged recess preferably has a volume that is defined by a depth of approximately 0.2-0.24 inch (0.51-0.61 cms.) and a diameter of approximately 0.125-0.156 inch (0.32-0.40 cms.). The lower end 86 of the upper end plug 72 has a tapered sidewall 90 which extends from the press fit length 84 at an angle of approximately eight to nine degrees and the press fit length is preferably, approximately, 0.080-0.150 inch (0.203-0.381 cms.). Preferably, the total extent of the upper end plug within the tubular cladding 56 is approximately 0.175 inch (0.445 cms.). The overall axial length of the upper end plug of this invention is approximately 0.375-0.390 inch (0.953-0.991 cms.) as compared to an overall length of 0.330 inch (0.84 cms.) of a conventional upper end plug.

The end face 86 is increased in diameter 0.015 inch (0.04 cms.) which gives a little mass increase and a shorter path to the cold body (the end stop 96 which holds the end cap in position during welding and functions as a heat sink). This drives heat flow toward the back end of the end plug and to the weld stop or end stop 96, and less toward the clad and end face 86 that contacts the plenum spring. The end stop turns freely in rolling element bearings, puts the end plug on center, gives a specific arc gap and acts as a heat sink. This enables the upper end plug for several different fuel rod models to have the same length, which avoids the necessity for changing the electrode position for the welding process which reduces manufacturing time and potential errors. There are a number of other advantages to this design including a large increase in eutectic margin.

While specific embodiments of the invention have been described in detail, it will be appreciated by those skilled in the art that various modifications and alternatives to those details could be developed in light of the overall teachings of the disclosure. For example, though the embodiment described above was applied to a fuel rod, the same principles can be applied to a control rod with the same beneficial effect. Accordingly, the particular embodiments disclosed are meant to be illustrative only and not limiting as to the scope of the invention which is to be given the full breadth of the appended claims and any and all equivalents thereof.

What is claimed is:

1. A nuclear fuel assembly element comprising:
   a tubular cladding;
   a lower end cap closing off a lower end of the tubular cladding;
   an upper end cap closing off an upper end of the tubular cladding, wherein a lower end portion of the upper end cap has a diameter that fits within the upper end of the tubular cladding and extends down into an interior of the tubular cladding a preselected distance and an upper end portion of the upper end cap is wielded to the upper end of the tubular cladding;
   a measure of an active material occupying a portion of the interior of the tubular cladding between the lower end cap and the upper end cap;
   a spring positioned in the interior of the tubular cladding between the upper end cap and an upper surface of the measure of active material, with one end of the spring against the lower end portion of the upper end cap and another end of the spring biasing the active material towards the lower end cap; and
   wherein the preselected distance is selected so that heat from a welding process that is employed to weld the upper end portion of the upper end cap to the upper end of the tubular cladding is dissipated at an interface of the one end of the spring and the lower end portion of the upper end cap to an extent that avoids substantial melting of the spring at the interface and the spring extends through a gas plenum in the interior of the tubular cladding and the lower end portion of the upper end cap has a recess in fluid communication with the gas plenum that adds to a gas storage volume of the gas plenum and the size of the recess substantially compensates for an added volume of the interior of the cladding occupied by the lower end portion of the upper end cap extending within the tubular cladding so that the measure of the active element that the interior of the tubular cladding can safely accommodate is not substantially reduced over that which could be employed if the upper end plug did not extend substantially into the fuel element tubular cladding.

2. The nuclear fuel assembly element of claim 1 wherein the nuclear fuel assembly element is a fuel rod.

3. The nuclear fuel assembly element of claim 1 wherein the nuclear fuel assembly element is control rod.

4. The nuclear fuel element of claim 1 wherein the recess has a volume defined by a depth of approximately 0.2-0.24 inch (0.51-0.61 cm) and a diameter of approximately 0.125-0.156 inch (0.32-0.40 cm).

5. The nuclear fuel element of claim 4 wherein the lower end portion of the upper end cap has a side wall that extends from a press fit length at an 8°-9° angle.

6. The nuclear fuel element of claim 5 wherein the press fit length is approximately 0.080-0.150 inch (0.203-0.381 cm).

7. The nuclear fuel element of claim 6 wherein the total extent of the upper end plug within the tubular cladding is approximately 0.175 inch (0.445 cm).

8. The nuclear fuel element of claim 7 wherein the overall length of the upper end plug is approximately 0.375 inch (0.95 cm).

\* \* \* \* \*